Sept. 7, 1937.  M. OLLEY  2,092,614
SPRING SUSPENSION
Filed Feb. 8, 1936  2 Sheets-Sheet 1
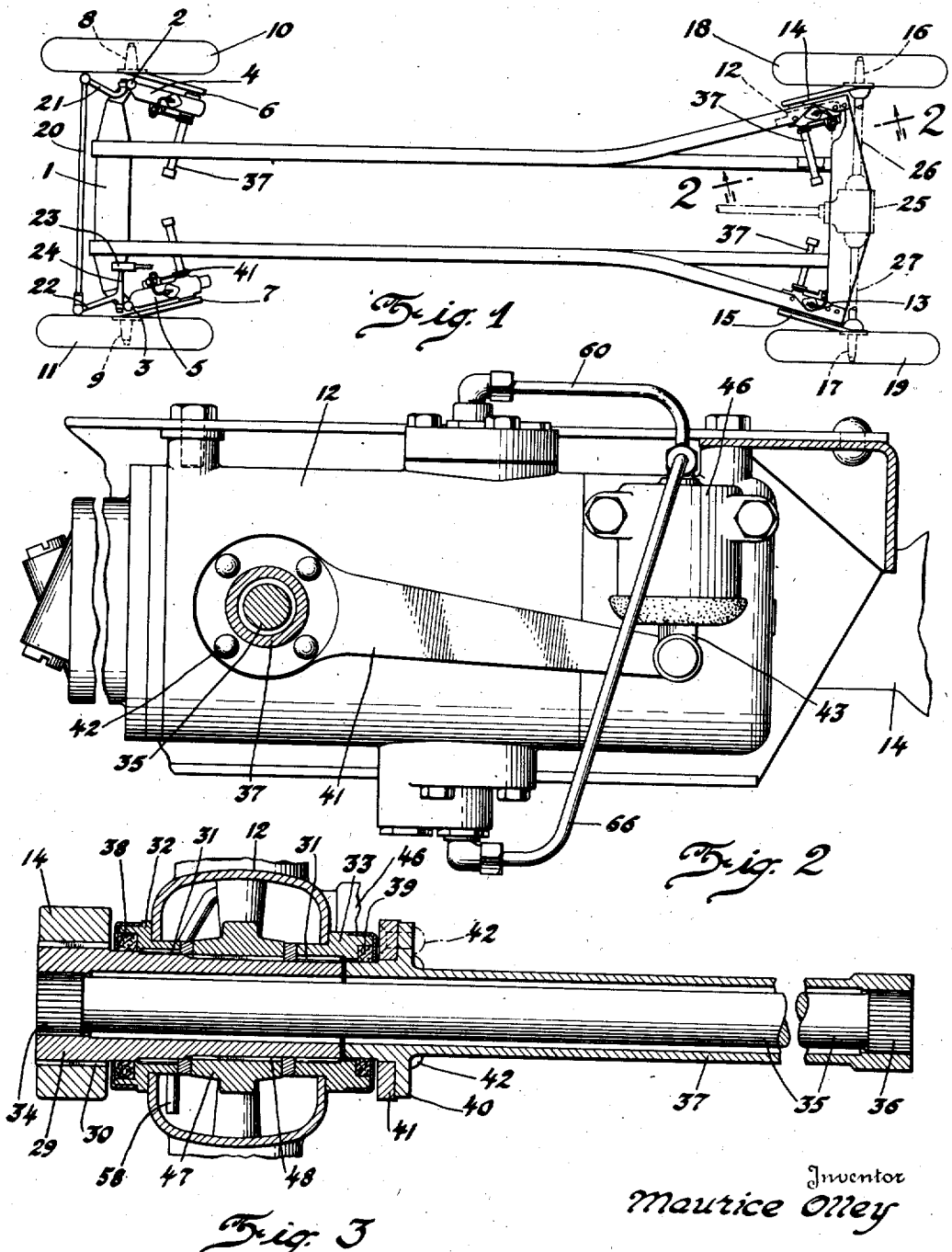
Inventor
Maurice Olley
By Blackmore, Spencer & Flint
Attorneys Sept. 7, 1937.　　　　M. OLLEY　　　　2,092,614
SPRING SUSPENSION
Filed Feb. 8, 1936　　　　2 Sheets-Sheet 2

Inventor
Maurice Olley
By Blackmore, Spencer & Flint
Attorneys

Patented Sept. 7, 1937

2,092,614

UNITED STATES PATENT OFFICE 2,092,614

SPRING SUSPENSION

Maurice Olley, Detroit, Mich., assignor to General Motors Corporation, Detroit, Mich., a corporation of Delaware Application February 8, 1936, Serial No. 62,956

9 Claims. (Cl. 267—57)

This invention relates to suspension systems and particularly to vehicle suspension systems having resilient means of which the effective rate or stiffness (i. e., the change in load required for each inch of deflection of the suspended part relatively to the unsuspended part of the vehicle) varies with the degree or deflection.

It relates particularly to such variable rate suspension systems in which a low rate resilient suspension is provided at or about the normal load position of the parts, while the effective rate of the suspension system increases with increased deflections of the parts away from their normal load position.

A variable rate suspension system of the foregoing type in which a higher rate increasingly resists deflection in either direction away from the normal position of the parts, is shown in copending United States patent application Serial Number 37,311, wherein the resilient means consists of a torsion rod spring of which the inherent rate is reduced in its position of normal deflection, while its effective rate is increased with increasing deflections in either direction away from normal.

In such a suspension system it is desirable to maintain the wheel supporting means relatively to the vehicle frame, in a normal position corresponding to the low rate position of deflection of the resilient means irrespective of any changes in the "normal" load carried by the vehicle in order to obtain the advantages of the soft suspension at or about any "normal" load position of the parts, with increasing stiffness (i. e., a higher spring rate) increasingly resisting deflections away therefrom. In other words, it is desirable to keep the variable rate resilient suspension means with its "low rate" position of deflection in proper registry with a normal load which varies.

The object of the invention is to provide a variable rate suspension system with means compensating for changes in the normal load, in order that the normal deflection of the resilient means shall be such that the relative changes in spring rate for positions of deflection at and away from the normal load position shall remain unchanged irrespective of the actual normal load which may be borne.

It is a further object of the invention to provide automatic means to effect the first named object.

A more specific object of the invention is a means of varying the effective strength of the spring in a variable rate vehicle suspension system without interfering with the changing rate characteristics of the suspension system and thereby retaining the coincidence of the lowest spring rate at or about the normal position of the parts irrespective of the actual normal load being borne by the vehicle.

The above and other objects of the invention will be apparent as the description proceeds.

According to the invention, the foregoing objects are achieved by varying the position in which the frame reaction end of the spring is connected to the vehicle frame. This is effected by hydraulic means, actuated by the ordinary running oscillatory deflections of the wheels relatively to the vehicle frame, whenever these oscillations take place through a range which does not extend equally on either side of the position of the wheel supporting means in the normal standing height position of the vehicle frame.

The drawings show the application of the invention to a motor vehicle independent suspension system of the general type shown in copending United States patent application Serial Number 37,311.

In the drawings:

Figure 1 is a plan view of the frame of a motor vehicle to which the invention has been applied to both front and rear wheels.

Figure 2 is an enlarged elevational view of the suspension unit housing of the right hand side rear wheel of Figure 1, as seen in the direction of the arrows 2—2 of Figure 1.

Figure 3 is an enlarged sectional view of the torsion rod spring of each suspension unit and showing the manner in which it is mounted within the suspension unit housing.

Figure 4:
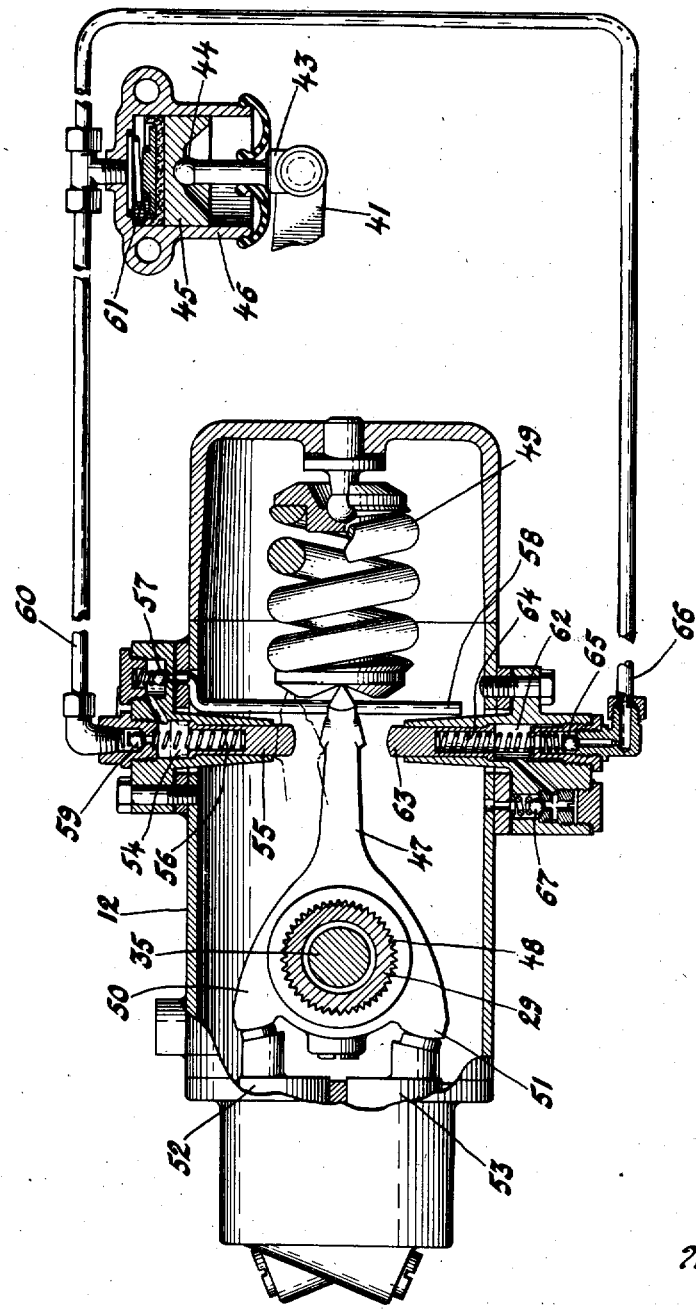
Figure 4 is a view in sectional elevation of the operative elements within the housings shown in Figure 2.

Referring now to Figure 1, the vehicle frame includes a transverse member 1 rigidly attached thereto. Mounted at each end of the transverse member 1 for pivotal movement in a substantially horizontal plane about pivot axes constituted by king pins 2 and 3 are brackets 4 and 5 constituting housings for each independent front wheel suspension unit.

The housings 4 and 5 extend from their king pins towards the transverse median plane of the vehicle and provide support for the substantially horizontal pivot axes of wheel supporting lever arms 6 and 7, extending forwardly therefrom, and carrying spindles 8 and 9 for road wheels 10 and 11 respectively.

Housings 12 and 13, (similar to the housings 4 and 5, except that they are rigidly attached to the vehicle frame), are provided for each independent rear wheel suspension unit, with wheel supporting lever arms 14 and 15 extending rearwardly from their substantially horizontal pivot axes and carrying bearings for the stub axles 16 and 17 of road wheels 18 and 19 respectively.

The dirigible wheels 10 and 11 are connected together for dirigible movement about their king pin axes by a tie rod 20 between steering arms 21 and 22 attached to the housings 4 and 5 respectively. A drag link 23 constitutes the connection between the branch 24 of the steering arm 22 and a conventional steering gear (not shown).

The rear wheels 18 and 19 are driven from the differential gear 25 which is mounted on the vehicle frame, by means of drive shafts 26 and 27 universally jointed to the differential gears and the stub axles of the rear wheels 18 and 19, respectively and provided with any suitable form of sliding or telescopic connection therewith (not shown).

As shown in Figure 1, the pivot and wheel spindle axes of each wheel supporting lever arm normally lie in vertical planes intersecting each other on the vehicle side of the wheel.

The remaining elements of the suspension units being identical for each wheel 10, 11, 18 and 19, it will be sufficient to describe those in conjunction with the housing 12.

Referring now particularly to Figures 2 and 3, the wheel supporting lever arm 14 is mounted in the housing 12 on a substantially horizontal tubular pivot axis 29 through the medium of suitable inter-engaging serrations 30 on these parts. The tubular pivot axis 29 is supported in needle bearings 31 in races 32 and 33 in the housing 12.

Fastened within the bore of the tubular pivot axis 29 through the medium of serrations 34, at that end thereof carrying the wheel supporting lever arm 14, is a torsion rod 35 extending inwardly of the vehicle therefrom. The inner end of this torsion rod 35 is provided with serrations 36 engaging the serrated bore of a torsion tube 37, which encloses the remaining portion of the torsion rod extending inwardly of the vehicle from the tubular pivot axis 29 in the housing 12. The other end of the torsion tube is carried in the housing 12 in a pilot bearing constituted by an extension of the race 33. Suitable gland packings 38 and 39 are provided between the races 32 and 33 and the tubular pivot axis 29 and the torsion tube 37 respectively.

The torsion tube is provided with a flange 40 to which is attached one end of a lever 41 by rivets such as 42 or the like. The other end of the lever 41 is pivoted to a rod 43 which has at its opposite end (as shown in Figure 4), a ball end 44 bearing against a ram 45 in a cylinder 46 mounted on the housing 12.

Means later to be described are provided to control the position of the ram 45 in its cylinder 46 and hence the position of the lever 41.

It will be seen that the torsion rod 35 in series with its enclosing torsion tube 37, torsionally resists pivotal movement of the wheel supporting lever arm about its pivot axis provided by the tubular member 29, and thus constitutes a means resiliently resisting upward and downward deflections of the wheel 18 relatively to the vehicle frame, the spring reaction being taken through the lever arm 41 and the movable ram 45 to the vehicle frame.

As shown in Figure 4, there is, within the housing 12, a lever arm 47 which is attached to the tubular member 29 through the medium of inter-engaging serrations 48 between the parts.

The lever arm 47 constitutes one link of a toggle of which the other link is an auxiliary spring means 49, assisting, through the tubular member 29, torsional deflection of the end 34 of the combined torsion spring 35, 37 relatively to the end 40 which is held by the lever 41, in either direction away from its normal load position. As a result of the toggle connection, the auxiliary spring 49 assists torsional deflection of the torsion spring to a lessening extent with increasing deflections thereof in either direction away from its normal position and thereby provides a variable rate suspension system of the type set forth.

The lever arm 47 is provided with a pair of lugs 50 and 51 constituting cams coacting with pistons 52 and 53 of a hydraulic damper to damp the movement of the lever 47 and hence the wheel supporting means, in the manner described in copending application Serial Number 37,311.

Compensating means are provided in order that the toggle constituted by the lever 47 and the spring 49 will be straight in the normal load position and hence in a position corresponding to the lowest spring rate of the variable rate combination, irrespective of a change in the normal load actually borne by the vehicle. These compensating means are made effective by oscillations of the lever 47 whenever these oscillations take place other than equally on either side of the normal straight position of the toggle. Such oscillations are made effective to move the lever arm 41 to a position in which, the torsion spring is "wound up" or "unwound" until the toggle is normally straight and in the position of lowest spring rate, with the actual normal load then being borne.

Referring now particularly to Figure 4, and it being understood that the housing 12 forms a reservoir of oil, hydraulic means as follows are provided, automatically varying the position of the ram 45 and hence of the lever arm 41 and the frame reaction end 40 of the torsion spring 35, 37 in accordance with variations in the normal load borne by the vehicle.

In the top of the housing 12 a pump is provided consisting of a chamber 54 for a plunger 55 extending downwardly into the path of movement of the lever arm 47. The plunger 55 is provided with a shoulder limiting the outward movement thereof under the influence of a spring 56. A spring loaded non-return ball check valve 57 is provided for the influx of oil into the chamber 54 from a suction pipe 58 extending towards the bottom of the housing 12. A spring loaded non-return ball check valve 59 is provided for the delivery of oil from the pump into a pipe line 60 connected to the top of the cylinder 46 of the ram 45. A spring 61 between the ram 45 and the top of the cylinder 46 yieldingly urges the ram 45 into contact with the ball end of the rod 43.

When the wheel 18 is carrying its lightest normal load the ram 45 is at the top of the cylinder and the lever 41 is in its highest position, while the car has a standing height such that the toggle 47—49 is straight corresponding to the lowest spring rate position of the variable rate combination.

With a greater normal load there will be a greater deflection of the torsion spring and the standing height of the vehicle will be reduced. When the vehicle begins to move, however, the ordinary running oscillations of the wheel as it passes over uneven surfaces are such that the lever arm 47 will frequently strike the plunger 55. Reciprocation of the plunger 55 pumps oil through the pipe line 60 and into the cylinder 46 depressing the ram 45 which through lever 41 "winds up" the torsion spring 35, 37 and thereby increases the "standing height" of the vehicle until frequent contact of the lever 47 and plunger 55 no longer occurs.

The torsion spring 35, 37 having been wound up to a mean position of deflection in which the toggle is straight, it will be appreciated that any further oscillations of the lever 47 sufficient to actuate the plunger 55 would overdepress the ram 45, thus overcompensating for the increased load. To prevent this occurrence, means as follows, are provided to remove oil from the cylinder 46 as fast as it is pumped in by the plunger 55 when sufficient compensation has been secured.

In the lower part of the housing 12 a pump is provided consisting of a chamber 62 for a plunger 63, extending upwardly into the path of movement of the lever arm 47. The plunger 63 is provided with a shoulder limiting the outward movement thereof under the influence of a spring 64. A spring loaded non-return ball check valve 65 is provided for the influx of oil into the chamber 62 from the cylinder 46 through a pipe line 66. The inlet valve 65 has a light spring easily overpowered by the pressure in the pipe line 66. A spring loaded non-return ball check valve 67 is provided for the discharge of oil back into the reservoir in the housing 12. The discharge valve 67 has a spring heavy enough to hold it against a pressure somewhat higher than the pressure required to support the heaviest normal load which it is expected to carry. When the system is excessively loaded this valve 67 functions as a safety valve.

The shoulders on the plungers 55 and 63 have a ground seating in the chambers 54 and 62 respectively, so that when the vehicle is at rest there is no leakage past the plungers.

It will be seen therefore that a variable rate suspension system which through the ordinary running oscillations of the wheels relatively to the vehicle frame, when the vehicle is in motion, will rapidly adjust itself to changes in the normal load carried, has been provided.

The suspension will always ride at or near the position corresponding to the lowest spring rate of the variable rate spring suspension combination. The closeness and rapidity of adjustment will depend on the separating distance between the ends of the plungers 55 and 63 and the lever 47.

The combination is of advantage for the suspension of rear wheels, firstly because the non-parallel pivot and wheel spindle axes of the wheel supporting lever arm provide for a conical swinging motion of the wheels which is calculated to increase the roll-stability and improve the steering ability of the vehicle, while—because the standing height of the vehicle body from the road is maintained constant irrespective of variations in the normal load carried,—extreme changes in the camber of the wheels which adversely affect the wear of the tires and the steering and handling of the vehicle are avoided.

Furthermore, the maintenance of a constant standing height in a suspension system with fixed limits of spring deflection reduces the incidence and danger of the running gear striking the suspended parts of the vehicle, and specifically in vehicles having independent suspension, the danger of a suspended part of the vehicle striking the road, when the vehicle is overloaded.

I claim:

1. In a vehicle having a variable rate suspension system of the torsion rod type, having one end of a torsion spring connected to a road wheel supporting means and the other end thereof connected to the vehicle frame, means compensating for changes in the normal load borne by the vehicle by a turning adjustment of one end of the torsion spring about its axis in relation to the member to which the said end is connected, whereby the same relative changes in spring rate for positions of deflection of the torsion spring at and away from their normal position, will be maintained irrespective of the normal load which may be borne.

2. The combination according to claim 1 in which the variable rate is obtained by reducing the inherent rate of the torsion spring in its position of normal deflection while its effective rate is increased with increasing deflections in either direction away from normal, said variations in effective spring rate being effected by means including an auxiliary spring acting on a lever arm rigidly connected to a part of the torsion spring which is torsionally deflected by the load, and in which the turning adjustment of one end of the torsion spring is effected by means responsive to oscillations of the lever arm.

3. In a vehicle suspension system of the torsion rod type, having a torsion spring connected between a road wheel supporting means and the vehicle frame, a lever arm rigidly attached to a part of the torsion spring which is torsionally deflected by the load on the vehicle, said lever arm oscillating with changing deflections of the torsion spring and the running oscillations of the road wheel and its supporting means relatively to the vehicle frame but having a mean position for a given load on the vehicle, automatic adjusting means operative to change the relative position of the connection between the torsion spring and one of the parts between which it is mounted, and thereby to restore the lever arm to the same mean position when the load on the vehicle is changed and to maintain this mean position constant, said automatic adjusting means being responsive to the said running oscillations whenever these take place through a range which does not extend equally on either side of the desired constant mean position.

4. The combination according to claim 3 in which the lever arm is attached to that part of the torsion spring which is connected to the road wheel supporting means, and the automatic adjusting means is operative between that part of the torsion spring which is connected to the vehicle frame, whereby the road wheel supporting means is restored to the same mean position when the load on the vehicle is changed.

5. The combination according to claim 3 in which the automatic adjusting means includes a cylinder, a ram within the cylinder, a pump plunger actuated by oscillations of the lever arm in one direction to pump fluid into the ram cylinder, a second pump plunger actuated by oscillations of the lever arm in an opposite direction to pump fluid out of the ram cylinder, and means responsive to movements of the ram to twist the torsion spring at its connection with one of the parts between which it is mounted, the volume pumped by the first plunger being unequal to the volume pumped by the second plunger when the running oscillations take place through a range which does not extend equally on either side of the desired constant mean position of the lever arm.

6. In a vehicle having resilient suspension means operatively connected between a road wheel supporting means and the vehicle frame, said vehicle having, for an assumed normal lead, a certain standing height and normal position of the suspended parts of the vehicle relatively to the wheel supporting means and to the road, adjustable means to compensate for changes in the normal load and to restore and maintain the said standing height irrespective of the changes in the normal load, said adjustable means being interposed between the resilient means and one of the parts to which it is operatively connected at the point of connection between the resilient means and the said part, the adjustment being automatically effected by means responsive to the running oscillation of the road wheel and its supporting means relatively to the vehicle frame, whenever the said oscillations take place through a range which extends unequally on either side of that position of the wheel supporting means corresponding to the said standing height for the assumed normal load.

7. In a vehicle having resilient suspension means of the torsion rod type, operatively connected between a road wheel supporting means and the vehicle frame, said vehicle having, for an assumed normal load, a certain standing height and normal position of the suspended parts of the vehicle relatively to the wheel supporting means and to the road, adjustable means to compensate for changes in the normal load and to restore and maintain the said standing height irrespective of the changes in the normal load, said adjustable means being interposed between the torsion spring and the vehicle frame.

8. In a vehicle having resilient suspension means operatively connected between a road wheel supporting means and the vehicle frame, said vehicle having, for an assumed normal load, a certain standing height and normal position of the suspended parts of the vehicle relatively to the wheel supporting means and to the road, adjustable means to compensate for changes in the normal load and to restore and maintain the said standing height irrespective of the changes in the normal load, said adjustable means being interposed between the resilient means and one of the parts to which it is operatively connected at the point of connection between the resilient means and the said part, said adjustment being automatically effected by power means generated by, and responsive to, the running oscillations of the road wheel and its supporting means relatively to the vehicle frame, whenever the said oscillations take place through a range which extends unequally on either side of that position of the wheel supporting means corresponding to the said standing height for the assumed normal load.

9. In a vehicle having resilient suspension means operatively connected between a road wheel supporting means and the vehicle frame, said vehicle having, for an assumed normal load, a certain standing height and normal position of the suspended parts of the vehicle relatively to the wheel supporting means and to the road, adjustable means to compensate for changes in the normal load and to restore and maintain the said standing height irrespective of the changes in the normal load, said adjustable means being interposed between the resilient means and one of the parts to which it is operatively connected at the point of connection between the resilient means and the said part, and including a cylinder and a ram therein, the position of the ram within the cylinder being controlled hydraulically by a pair of pumps actuated by means responsive to the running oscillations of the road wheel and its supporting means relatively to the vehicle frame, and arranged to pump oil into and out of the cylinder respectively, in amounts varying to the extent that the oscillations take place through a range which extends unequally on either side of that position of the wheel supporting means corresponding to the said standing height for the assumed normal load.

MAURICE OLLEY.

---

CERTIFICATE OF CORRECTION.

Patent No. 2,092,614. September 7, 1937.

MAURICE OLLEY.

It is hereby certified that error appears in the printed specification of the above numbered patent requiring correction as follows: Page 4, first column, line 7, claim 6, for the word "lead" read load; and that the said Letters Patent should be read with this correction therein that the same may conform to the record of the case in the Patent Office.

Signed and sealed this 26th day of October, A. D. 1937.

(Seal)

Henry Van Arsdale,
Acting Commissioner of Patents.

which does not extend equally on either side of the desired constant mean position of the lever arm.

6. In a vehicle having resilient suspension means operatively connected between a road wheel supporting means and the vehicle frame, said vehicle having, for an assumed normal lead, a certain standing height and normal position of the suspended parts of the vehicle relatively to the wheel supporting means and to the road, adjustable means to compensate for changes in the normal load and to restore and maintain the said standing height irrespective of the changes in the normal load, said adjustable means being interposed between the resilient means and one of the parts to which it is operatively connected at the point of connection between the resilient means and the said part, the adjustment being automatically effected by means responsive to the running oscillation of the road wheel and its supporting means relatively to the vehicle frame, whenever the said oscillations take place through a range which extends unequally on either side of that position of the wheel supporting means corresponding to the said standing height for the assumed normal load.

7. In a vehicle having resilient suspension means of the torsion rod type, operatively connected between a road wheel supporting means and the vehicle frame, said vehicle having, for an assumed normal load, a certain standing height and normal position of the suspended parts of the vehicle relatively to the wheel supporting means and to the road, adjustable means to compensate for changes in the normal load and to restore and maintain the said standing height irrespective of the changes in the normal load, said adjustable means being interposed between the torsion spring and the vehicle frame.

8. In a vehicle having resilient suspension means operatively connected between a road wheel supporting means and the vehicle frame, said vehicle having, for an assumed normal load, a certain standing height and normal position of the suspended parts of the vehicle relatively to the wheel supporting means and to the road, adjustable means to compensate for changes in the normal load and to restore and maintain the said standing height irrespective of the changes in the normal load, said adjustable means being interposed between the resilient means and one of the parts to which it is operatively connected at the point of connection between the resilient means and the said part, said adjustment being automatically effected by power means generated by, and responsive to, the running oscillations of the road wheel and its supporting means relatively to the vehicle frame, whenever the said oscillations take place through a range which extends unequally on either side of that position of the wheel supporting means corresponding to the said standing height for the assumed normal load.

9. In a vehicle having resilient suspension means operatively connected between a road wheel supporting means and the vehicle frame, said vehicle having, for an assumed normal load, a certain standing height and normal position of the suspended parts of the vehicle relatively to the wheel supporting means and to the road, adjustable means to compensate for changes in the normal load and to restore and maintain the said standing height irrespective of the changes in the normal load, said adjustable means being interposed between the resilient means and one of the parts to which it is operatively connected at the point of connection between the resilient means and the said part, and including a cylinder and a ram therein, the position of the ram within the cylinder being controlled hydraulically by a pair of pumps actuated by means responsive to the running oscillations of the road wheel and its supporting means relatively to the vehicle frame, and arranged to pump oil into and out of the cylinder respectively, in amounts varying to the extent that the oscillations take place through a range which extends unequally on either side of that position of the wheel supporting means corresponding to the said standing height for the assumed normal load.

MAURICE OLLEY.

CERTIFICATE OF CORRECTION.

Patent No. 2,092,614. September 7, 1937.

MAURICE OLLEY.

It is hereby certified that error appears in the printed specification of the above numbered patent requiring correction as follows: Page 4, first column, line 7, claim 6, for the word "lead" read load; and that the said Letters Patent should be read with this correction therein that the same may conform to the record of the case in the Patent Office.

Signed and sealed this 26th day of October, A. D. 1937.

(Seal)

Henry Van Arsdale,
Acting Commissioner of Patents.

CERTIFICATE OF CORRECTION.

Patent No. 2,092,614. September 7, 1937.

MAURICE OLLEY.

It is hereby certified that error appears in the printed specification of the above numbered patent requiring correction as follows: Page 4, first column, line 7, claim 6, for the word "lead" read load; and that the said Letters Patent should be read with this correction therein that the same may conform to the record of the case in the Patent Office.

Signed and sealed this 26th day of October, A. D. 1937.

(Seal)

Henry Van Arsdale,
Acting Commissioner of Patents.